June 9, 1959 B. D. LOUGHLIN 2,890,273

WAVE-SIGNAL MODIFYING APPARATUS

Filed Dec. 14, 1954 3 Sheets-Sheet 1

June 9, 1959 B. D. LOUGHLIN 2,890,273

WAVE-SIGNAL MODIFYING APPARATUS

Filed Dec. 14, 1954 3 Sheets-Sheet 3

United States Patent Office 2,890,273
Patented June 9, 1959

2,890,273

WAVE-SIGNAL MODIFYING APPARATUS

Bernard D. Loughlin, Lynbrook, N.Y., assignor to Hazeltine Research, Inc., Chicago, Ill., a corporation of Illinois Application December 14, 1954, Serial No. 475,138

12 Claims. (Cl. 178—5.4)

*General*

The present invention is directed to wave-signal modifying apparatus for converting a wave signal which is double side-band modulated at one phase by one component and at least partially single side-band modulated at another phase by another component into a wave signal which is double side-band modulated by both components. More specifically, the present invention is directed to modifying an NTSC type of color subcarrier wave signal modulated by a double side-band Q component and a partially single side-band I component into a subcarrier wave signal double side-band modulated by both the I and Q components.

In the form of color-television system now standard in the United States, hereinafter referred to as the NTSC color-television system, information representative of a scene in color being televised is utilized to develop at the transmitter two substantially simultaneous signals, one of which is primarily representative of the luminance and the other representative of the chrominance of the image. To develop the latter signals, the scene being televised is viewed by one or more television cameras which develop, for example, color signals G, R, and B individually representative, respectively, of the primary colors green, red, and blue of the scene. The signals G, R, and B are combined in specific proportions to develop a signal Y representative of the luminance of the televised image. Additionally, in one form of NTSC color-television system, the signals R and B are modified to color-difference signals $R-Y$ and $B-Y$ and these color-difference signals are utilized individually to modulate quadrature phases of a subcarrier wave signal having a mean frequency within the video-frequency pass band. The modulated subcarrier wave signal represents chrominance, that is, it represents the saturation and hue of the televised image. At a receiver in the NTSC system, the luminance and chrominance signals are detected and the hue and color saturation information is derived from the chrominance signal and combined with the luminance signal to develop the three color signals G, R, and B which are utilized to reproduce the televised color image.

Preferably, both of the color-difference signals should be translated as double side-band modulation of the subcarrier wave signal. However, double side-band transmission undesirably limits the band widths of the color-difference signals. For example, for a subcarrier wave signal of approximately 3.6 megacycles translated through video-frequency channels having pass bands of approximately 0–4.2 megacycles, the band widths of the modulating color-difference signals would be limited to approximately 0.6 megacycle if these signals are to be transmitted as double side-band modulation of the subcarrier wave signal. The band widths of the color-difference signals that are utilized cannot be arbitrarily limited since they have to be sufficiently wide to provide adequate chrominance information in the reproduced image and are, therefore, at least to some degree determined by the sensitivity of the human eye to saturation changes in colors represented by the different ones of the color-difference signals. Experience has indicated that the eye is less sensitive to saturation changes in colors along a green-white-magenta axis of a conventional color diagram. Information of approximately 0–.5 megacycle with respect to colors along such color axis appears to satisfy the response of the human eye to such colors. Consequently, in an NTSC type of system a signal representative of colors along such axis and designated the Q signal is transmitted with a band width of approximately 0.5 megacycle so as to effect double side-band modulation of the subcarrier signal. Having selected such Q signal, in order to provide chrominance information for the gamut of primary colors, a signal I representative of changes along another color axis orange-white-cyan is also developed at the transmitter and utilized to modulate another phase of the subcarrier wave signal. However, since the eye is more sensitive to changes along the latter color axis, the I signal requires a band width of approximately 1.5 megacycles. Consequently, the I signal is transmitted partially as double side-band modulation and partially as single side-band modulation of the subcarrier signal. Nevertheless, by transmitting the Q signal only as double side-band modulation of the subcarrier signal and only the I signal as partially single side-band modulation of such wave signal the tendency for cross talk between derived I and Q signals is minimized.

Though benefits are derived by utilizing I and Q modulation signals and deriving such at the receiver, due to the primary colors conventionally employed in the picture tube at the receiver, the derived I and Q signals may not be directly applied to this tube. At present, the I and Q signals are matrixed to develop the G, R, and B color signals. The requirement for such additional matrixing at the receiver to obtain the benefits of transmitting I and Q signals is undesirable at least for economic reasons. It would be preferable to derive the red, green, and blue color-difference signals directly while still obtaining the benefits of the narrow band Q and wide band I signals. The present invention is directed to subcarrier wave-signal modifying apparatus for modifying the received subcarrier wave signal to permit direct derivation of the green, red, blue, or any other color components.

It is, therefore, an object of the present invention to provide a new and improved wave-signal modifying apparatus for use in the color-signal deriving apparatus of a television receiver.

It is also an object of the invention to provide a wave-signal modifying apparatus for modifying the modulation components of a color subcarrier wave signal.

It is a further object of the invention to provide a wave-signal modifying apparatus for use in a color-signay deriving apparatus of a color-television receiver which is effective to simplify such apparatus and minimize the number of circuit elements required therein.

In accordance with the present invention, there is provided a wave-signal modifying apparatus comprising a circuit for supplying a wave signal double side-band modulated at one phase by one component modulating and at least partially single side-band modulated at another phase by another modulating component, the single side-band modulation of said signal extending over a frequency band beyond that of the double side-band modulation. Such apparatus includes signal-translating means coupled to the supply circuit and having a band-width at least including the double side-band signal modulation. In addition, such apparatus includes frequency-selective means coupled to the supply circuit and adapted to cooperate with the translating means to provide a band-width substantially coextensive with the frequency band of the single side-band signal modulation. Signal modifying means are connected to the frequency-selective means to receive the single side-band modulation therefrom and to derive the complementary side-band modulation required to convert it to double side-band modulation. Finally, the apparatus includes signal-combining means connected to the signal-translating means and to the signal-modifying means for combining the modulations produced thereby into a resultant wave signal which is double side-band modulated at said one and other phases, respectively, by said one and other modulating components.

For a better understanding of the present invention, together with other and further objects thereof, reference is had to the following description taken in connection with the accompanying drawings, and its scope will be pointed out in the appended claims.

Referring to the drawings.

Figure 1:
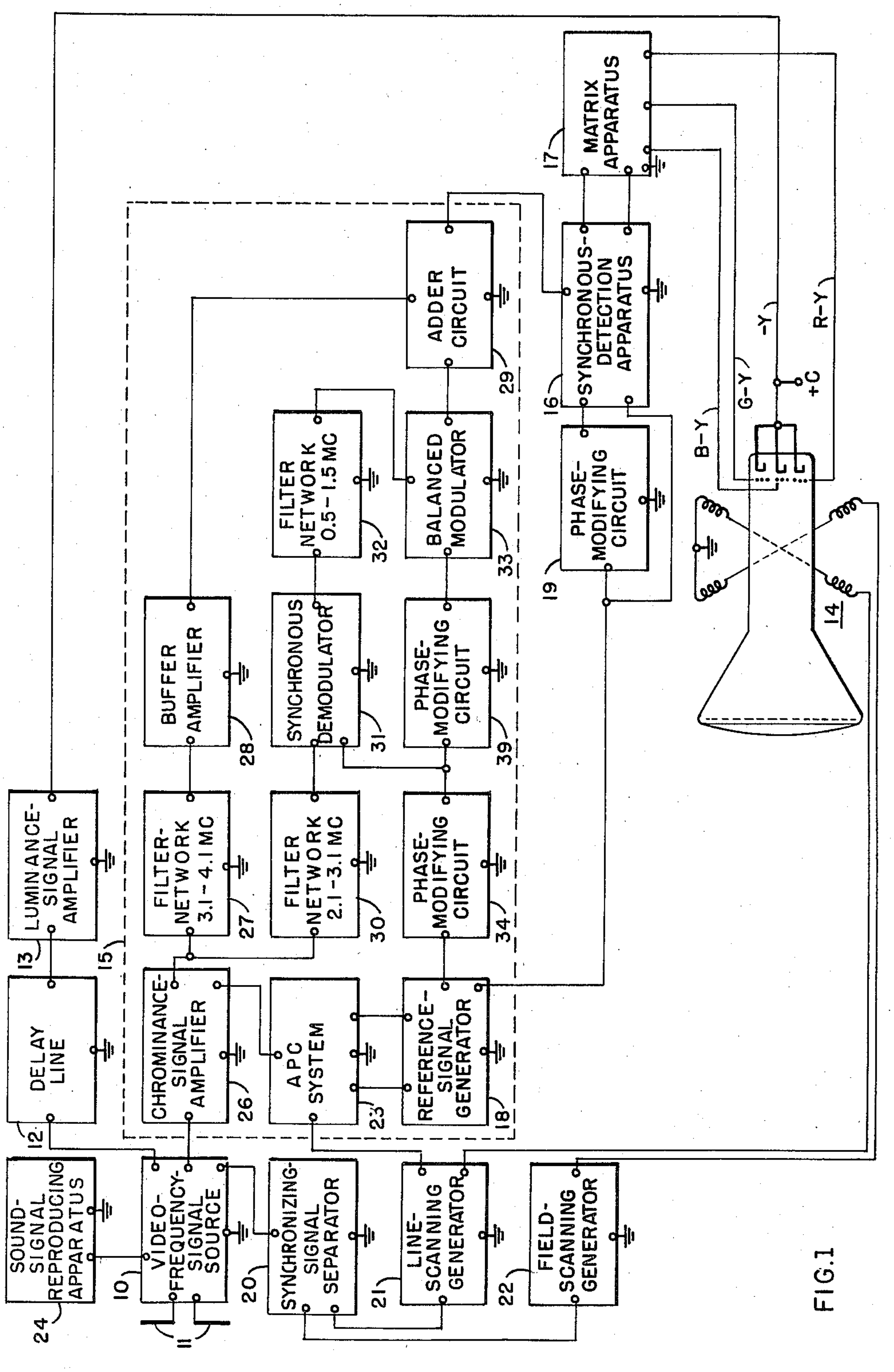
Fig. 1 is a circuit diagram of a color-television receiver having a wave-signal modifying apparatus in accordance with the present invention.

*General description of receiver of Fig. 1*

Referring now to Fig. 1 of the drawings, there is represented a color-television receiver of a type suitable for utilizing the standard NTSC color-television signal. The receiver includes a video-frequency signal source 10 having an input circuit coupled to an antenna system 11. It will be understood that the unit 10 may include a conventional source of a video-frequency signal of the NTSC type, for example, may comprise the initial stages of a color-television receiver including one or more stages of radio-frequency signal amplification, an oscillator-modulator, one or more stages of intermediate-frequency amplification, and a detector for deriving the video-frequency signal. Such detector stage may also include an automatic-gain-control circuit. Coupled to one output circuit of the video-frequency signal source, in cascade in the order named, is a wave-signal modifying apparatus 15, in accordance with the present invention and to be considered more fully hereinafter, a synchronous detection apparatus 16, a matrix apparatus 17, and an image-reproducing device 14. Different input circuits of the apparatus 16 are individually coupled through a phase-modifying circuit 19 and directly to an output circuit of a reference-signal generator 18 in the apparatus 15. Coupled between another output circuit of the source 10 and the cathode circuit of the device 14, in cascade in the order named, are a delay line 12 and a luminance-signal amplifier 13. The delay line 12 may be of conventional construction for equating the signal delay through the units 12 and 13 to that through the units 15, 16, and 17. The luminance-signal amplifier 13 is a conventional wide band amplifier for translating signals having a maximum band width of approximately 0–4.2 megacycles. The band width of the amplifier 13 may be limited to an upper frequency less than 4.2 megacycles if it is desired that no signal components having the frequency of the subcarrier wave signal be translated therethrough. The image-reproducing device 14 is conventional and may, for example, comprise a single cathode-ray tube having a plurality of cathodes and a plurality of control electrodes, different pairs of the cathode and control-electrode circuits being individually responsive to different color signals, as will be explained more fully hereinafter, and including an arrangement for directing the beams emitted from the cathodes individually onto different phosphors for developing different primary colors such as red, green, and blue. Such a tube is more fully described in an article entitled "General Description of Receivers for the Dot-Sequential Color Television System which Employ Direct-View Tri-Color Kinescopes" in the RCA Review for June 1950 at pages 228–232, inclusive. It should be understood that other suitable types of color-television image-reproducing devices may be employed. The synchronous detection apparatus 16 may also be of a conventional type widely used in NTSC type receivers for deriving, for example, the $R-Y$ and $B-Y$ color-difference signals. The matrix apparatus 17 may also be conventional for combining the derived $R-Y$ and $B-Y$ color-difference signals into a $G-Y$ color-difference signal.

Another output circuit of source 10 is coupled through a synchronizing-signal separator 20 to a line-scanning generator 21 and a field-scanning generator 22, output circuits of the latter units being coupled, respectively, to line-deflection and field-deflection windings of the image-reproducing device 14. An output circuit of the line-scanning generator 21, for example, a terminal on the conventional horizontal output transformer therein is coupled to an automatic-phase-control (APC) system 23 in the apparatus 15 for purposes to be considered more fully hereinafter. A sound-signal reproducing apparatus 24 is also coupled to the video-frequency signal source 10 and may include stages of intermediate-frequency amplification, a sound-signal detector, stages of audio-frequency amplification, and a sound-reproducing device.

It will be understood that the various units and circuit elements thus far described, with the exception of the wave-signal modifying apparatus 15, may be of any conventional construction and design, the details of such units and circuit elements being well known in the art and requiring no further description.

*General operation of receiver of Fig. 1*

Considering briefly now the operation of the receiver of Fig. 1 as a whole, an NTSC type of television wave signal is intercepted by the antenna system 11, selected, amplified, converted to an intermediate-frequency signal, and the latter signal further amplified in the unit 10, the video-frequency modulation components thereof being derived and developed in an output circuit of the unit 10. These video-frequency modulation components comprise synchronizing components, the aforementioned modulated subcarrier wave signal or chrominance signal including a color burst synchronizing signal, and a luminance or brightness signal. The luminance or brightness signal is translated through the delay line 12, amplified in the unit 13, and applied to the cathodes of the image-reproducing device 14. The modulated subcarrier wave signal or chrominance signal is translated through the apparatus 15, wherein it is modified in a manner to be considered more fully hereinafter, and applied to an input circuit of the synchronous detection apparatus 16. The apparatus 16 includes at least a pair of synchronous detectors individually responsive to different ones of the reference signals either translated directly from the generator 18 or through the phase-modifying circuit 19 for deriving from the applied chrominance signal modulation components, for example, the $R-Y$ and $B-Y$ modulation components thereof. The derived $R-Y$ and $B-Y$ modulation components are matrixed in the apparatus 17 in a conventional manner to develop the color-difference signal $G-Y$. The three color-difference signals are individually applied to different ones of the control electrodes in the image-reproducing device 14.

The line-frequency and field-frequency synchronizing signals are separated from the video-frequency components and from each other in the synchronizing-signal separator 20. The separated signals are applied to the generators 21 and 22 to synchronize the operation thereof with the operation of corresponding units at the transmitter. These generators supply signals of saw-tooth wave form which are properly synchronized with respect to the transmitted signal and are individually applied to the line-deflection and field-deflection windings of the image-reproducing device 14 to effect a rectilinear scanning of the screen in such device. The color-difference signals $B-Y$, $G-Y$, and $R-Y$ combine with the luminance signal $-Y$ in the electron guns of the device 14 effectively to develop color signals B, G, and R which intensity-modulate the cathode-ray beams emitted from the different guns. Such intensity modulation of these beams together with the raster scanning results in an excitation of the different color phosphors on the image screen to effect reproduction of the televised color image.

The sound-signal modulated wave signal accompanying the television signal is selected, amplified in the source 10, and applied to the sound-signal reproducing apparatus 24 as an intermediate-frequency signal. It is further amplified in the apparatus 24, detected and utilized to reproduce sound in a conventional manner.

*Description of wave-signal modifying apparatus of Fig. 1*

Considering now the wave-signal modifying apparatus 15 of Fig. 1, such apparatus includes a circuit for supplying a wave signal double side-band modulated at one phase by one component and at least partially single side-band modulated at another phase by another component. For example, such supply circuit is a chrominance-signal amplifier 26 preferably having a pass band of approximately 2.1–4.2 megacycles. An output circuit of the amplifier 26 is coupled through the automatic-phase-control system 23 to the generator 18 for controlling the phase of the signal developed therein.

The apparatus 15 also includes one channel coupled to the amplifier 26 for translating the wave signal supplied by the unit 26 with a band width including at least the double side-band portion of the aforementioned one modulation component. More specifically, the one channel includes, in cascade in the order named, a filter network 27 having a pass band of 3.1–4.1 megacycles and a buffer amplifier 28 coupled between the output circuit of the amplifier 26 and an adder circuit 29. The network 27, the amplifier 28, and the adder circuit 29, may be of conventional construction and may be designed to have a total signal delay time equal to that for a modifying circuit now to be considered.

The modifying apparatus 15 also includes a signal-modifying circuit coupled to the signal-translating channel just described and to the output circuit of the amplifier 26. More specifically, the signal-modifying circuit includes, in the order named, a filter network 30 having a pass band of 2.1–3.1 megacycles, a synchronous demodulator 31, a filter network 32 having a pass band of 0.5–1.5 megacycles, and a balanced modulator 33 coupled between the output circuit of the amplifier 26 and another input circuit of the adder circuit 29. The synchronous demodulator 31 is a periodically conductive device responsive to the single side-band portion of the wave signal translated through the network 30 and substantially unresponsive to the double side-band portion of the wave signal blocked by the network 30. The synchronous demodulator 31 may be a conventional device for deriving a portion of the modulation component at a predetermined phase, specifically at the phase of modulation of the I signal, of the subcarrier wave signal translated through the network 30. The balanced modulator 33 may be a conventional modulator for effecting modulation of a wave signal applied thereto by means of the low-frequency signal translated through the network 32.

Finally, the wave-signal modifying apparatus comprises means for controlling the conductivity of the device in synchronism with one of the modulation phases for causing the signal-modifying circuit to develop the complementary side band of the aforementioned single side band and to modify the wave signal developed in the output circuit of the chrominance-signal amplifier 26 into a resultant wave signal double side-band modulated by both modulation components of the wave signal. More specifically, such control means comprises the reference-signal generator 18 having an output circuit coupled through a phase-modifying circuit 34 to an input circuit of the demodulator 31 and through the unit 34 and an additional phase-modifying circuit 39 to an input circuit of the balanced modulator 33. The phase and frequency of the signal developed by the generator 18 are controlled by the APC system 23, in response to a color burst synchronizing signal applied to the system 23 by the amplifier 26, to have a specific relation to the modulated subcarrier wave signal amplified by the unit 26. The frequencies of the subcarrier wave signal and the signal developed by the generator 18 are maintained equal and the phase relation is so maintained that the signal directly applied to the apparatus 16 from the generator 18 is in phase with the modulation phase of the subcarrier wave signal of one of the signals to be derived in the apparatus 16. For example, the phase of the signal directly applied from the generator 18 is in phase with the modulation phase of the $R-Y$ color-difference signal. In such case, the design of the phase-modifying circuit 19 is such as to delay the phase of the signal developed in the output circuit of the generator 18 under consideration so that in another detector in the apparatus 16 such delayed signal is in phase with the modulation phase of the $B-Y$ color-difference signal.

The phase-modifying circuit 34 controls the phase of the signal translated therethrough so that such phase occurs in coincidence with that phase of the applied chrominance signal at which the I-modulation component occurs and thereby causes the demodulator 31 to be conductive in synchronism with the I-modulation phase. The circuit 39 controls the phase of the reference signal translated therethrough so that the I-modulated signal developed in the output circuit of the modulator 33 and applied to the adder circuit 29 is in phase with the I-modulation phase of the signal translated through the units 27 and 28 and also applied to the adder circuit 29.

*Operation of wave-signal modifying apparatus of Fig. 1*

Considering now the operation of the signal-modifying apparatus 15 of Fig. 1, a chrominance signal, specifically the modulated subcarrier wave signal and its side bands extending over the range of 2.1–4.2 megacycles, is translated through the amplifier 26. Such subcarrier wave signal with its side bands is diagrammatically represented by Curve A of Fig. 2 and has a mean frequency of approximately 3.6 megacycles, a double side-band region between 3.1 and 4.1 megacycles, and a single side-band region between 2.1 and 3.1 megacycles.

Figure 2:
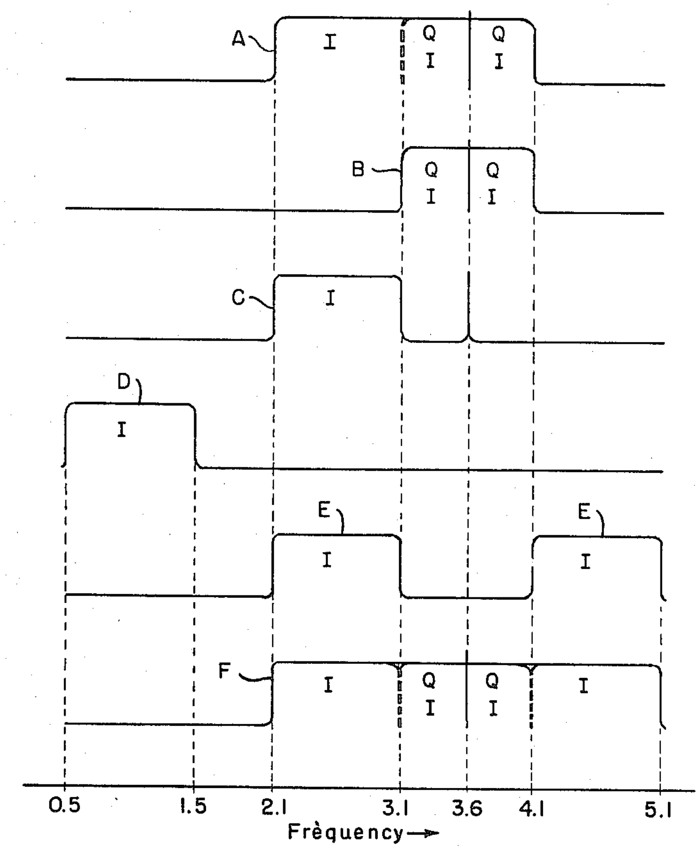
Fig. 2 is a group of spectrum diagrams useful in explaining the operation of the modifying apparatus of Fig. 1.

The double side-band region includes the modulation components I and Q at quadrature phases of the subcarrier wave signal and these components are translated through the network 27 and the buffer amplifier 28 and applied to an input circuit of the adder circuit 29. Such translated double side-band component is represented by Curve B of Fig. 2. The single side-band component, represented by Curve C of Fig. 2, is translated through the network 30 and applied to an input circuit of the synchronous demodulator 31. A sine-wave signal having the same frequency as the subcarrier wave signal, that is, a frequency of approximately 3.6 megacycles and in phase with the I-signal modulation phase of the modulated subcarrier wave signal is also applied to an input circuit of the synchronous demodulator 31. The pair of applied signals heterodyne in the demodulator 31 to develop a beat-frequency signal having a band width of 0.5–1.5 megacycles and representative of that portion of the I signal which effects single side-band modulation of the subcarrier wave signal. The derived component, represented by Curve D of Fig. 2, is translated through the network 32 and applied to an input circuit of the balanced modulator 33. The signal in the output circuit of the phase-modifying circuit 39 is applied to the other input circuit of the balanced modulator 33. The derived I-signal component, represented by Curve D of Fig. 2, modulates the 3.6 megacycle signal applied to the modulator 33 to develop a pair of side-band components such as represented by Curve E of Fig. 2. The 3.6 megacycle reference signal modulated in the unit 33 is controlled by the phase-modifying circuit 39 to be in phase with the I-modulation component of the signal translated through the units 27 and 28. Consequently, in the adder circuit 29 the signal developed in the output circuit of the modulator 33, and represented by Curve E of Fig. 2, combines with the signal translated through the units 27 and 28, and represented by Curve B of Fig. 2, to develop a resultant subcarrier wave signal such as represented by Curve F of Fig. 2. The resultant subcarrier wave signal is double side-band modulated by both the Q and I modulation components. Because of such double side-band modulation, the I and Q signals, or any components defined by combination of such I and Q signals and derivable from the subcarrier wave signal, for example, the *R—Y* and *B—Y* modulation components, may be directly derived in the synchronous detection apparatus 16 with all the double side-band benefits formerly only available by deriving the I and Q components, that is, such signals may be derived without causing the spurious effects resulting from the cross-talk deficiencies of single side-band modulation to be developed.

Figure 3:
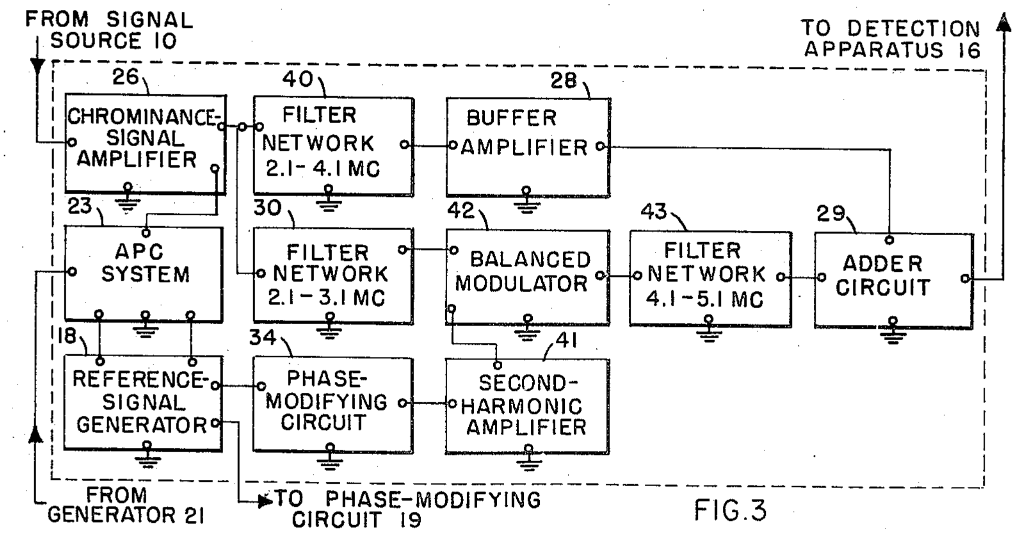
Fig. 3 is a circuit diagram of a modified form of a portion of the modifying apparatus of Fig. 1.

*Description and explanation of operation of wave-signal modifying apparatus of Fig. 3*

Though the modifying apparatus 15 of Fig. 1 is effective to permit direct derivation of the *R—Y* and *B—Y* or other color-difference signals directly from the subcarrier wave signal without intermediate derivation of I and Q color-difference signals, the apparatus 15 may require more circuit elements and circuit components than desirable for the benefits obtained. The apparatus of Fig. 3 requires less components to effect the result obtained in the apparatus 15 of Fig. 1.

Since many of the circuit components in the apparatus of Fig. 3 are the same as components in the apparatus of Fig. 1, such components are identified by the same reference numerals.

In the apparatus of Fig. 3 the channel for translating the signal with a band width including at least the double side-band portion of one of the modulation components includes a band-pass filter network 40 having a pass band of 2.1–4.1 megacycles. Such network is effective to translate not only the 3.1–4.1 double side-band portion of the modulated subcarrier wave signal but also the single side-band portion between the frequencies 2.1 and 3.1 megacycles. Additionally, in the apparatus of Fig. 3 the signal-modifying circuit includes a balanced modulator 42 and a filter network 43 having a pass band of 4.1–5.1 megacycles coupled, in the order named, between the output circuit of the filter network 30 and an input circuit of the adder circuit 29. A second harmonic amplifier 41 is coupled between the output circuit of the phase-modifying circuit 34 and an input circuit of the balanced modulator 42. The second harmonic amplifier 41 is effective to develop a signal having approximately a frequency of 7.2 megacycles and in phase with the modulation phase of the I signal on the subcarrier wave signal translated through the network 30. The balanced modulator 42 may be a conventional modulator.

In operation, the modifying apparatus of Fig. 3 translates the modulated subcarrier wave signal partially double side-band modulated and partially single side-band modulated through the network 40 and the buffer amplifier 28 for application to an input circuit of adder circuit 29. The upper side band corresponding to the side band in the region of 2.1–3.1 megacycles is not translated through the units 28 and 40 or prior stages in the receiver or transmitter due to the upper frequency cutoff characteristics of the system through which the television signal including such modulated subcarrier wave signal is conventionally translated.

The components of the lower side band in the region of 2.1–3.1 megacycles are translated through the network 30 and applied to an input circuit of the balanced modulator 42. A 7.2 megacycle sine-wave signal in phase with that modulation phase of the subcarrier wave signal at which the I signal modulates such wave signal, that is, with a peak of the second harmonic signal in coincidence with the I-modulation phase, is also applied to the modulator 42. The 2.1–3.1 megacycle component heterodynes with the 7.2 megacycle signal in the modulator 42 to develop a component having the frequency range of 4.1–5.1 megacycles. The latter component corresponds to the upper side band of the 2.1–3.1 megacycle component. The 4.1–5.1 megacycle component is applied to an input circuit of the adder circuit 29 wherein it combines with the subcarrier wave signal applied to the other input circuit of the adder circuit 29 to develop a resultant wave signal having double side-band modulation for both the I and Q components. This double side-band modulated subcarrier wave signal is utilized in detection apparatus such as the unit 16 in Fig. 1 in the manner previously described herein.

Though the above apparatus has been described as utilizing a balanced modulator 42, an unbalanced modulator may be employed if only components having the double side-band frequencies of 3.1–4.1 megacycles are translated through the units 40 and 28 and the single side-band components in the range of 2.1–3.1 megacycles are translated through the units 30, 42, and 43 by modifying the pass band of network 43 to cover at least the ranges of 2.1–3.1 and 4.1–5.1 megacycles.

Figure 4:
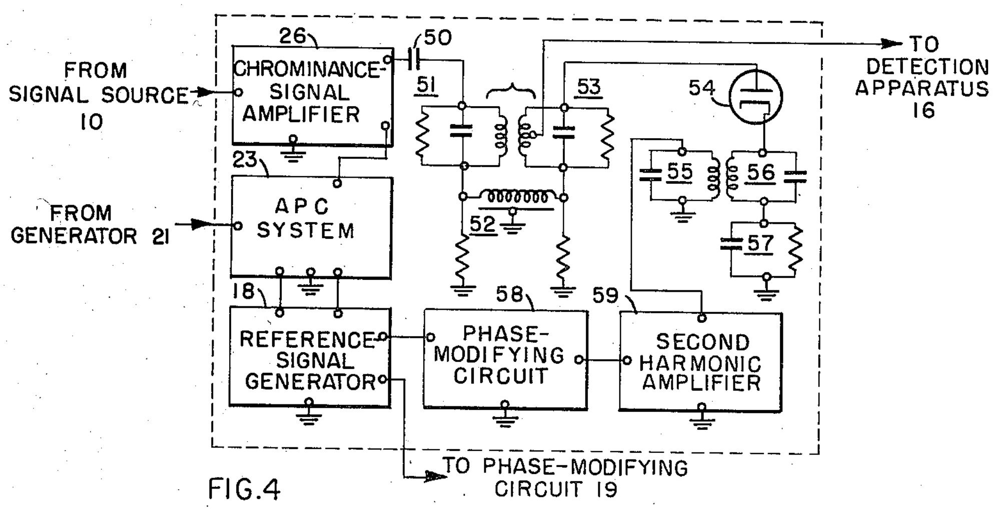
Fig. 4 is a circuit diagram of an additional modified form of a portion of the modifying apparatus of Fig. 1.

*Description and explanation of operation of wave-signal modifying apparatus of Fig. 4*

Though the apparatus of Fig. 3 requires less circuit components than that of Fig. 1 to effect the same result, it may sometimes be beneficial to utilize a wave-signal modifying apparatus requiring even less circuit components than those described with reference to Fig. 3. The apparatus of Fig. 4 employs a minimum of circuit components for modification of the subcarrier wave signal from one partially single side-band modulated to one including only double side-band modulation. Those circuit components in the apparatus of Fig. 4 which are identical with components in the apparatus of Fig. 1 are indicated by the same reference numerals as used in Fig. 1.

Referring now to the apparatus of Fig. 4, the channel for translating the wave signal with a band width including at least the double side-band portion of one of the modulation components comprises a delay line 52. The delay line 52 is in parallel circuit with a pair of inductively coupled tuned circuits 51 and 53 having a pair of terminals thereof coupled by means of the delay line 52. The terminal of the tuned circuit 51 remote from the delay line 52 is connected to an output circuit of the chrominance-signal amplifier 26 through a condenser 50 while a center tap of the tuned circuit 53 is coupled to detection apparatus such as the unit 16 of Fig. 1. The circuits 51 and 53 are broadly resonant at the mean frequency of the subcarrier wave signal to have a pass band for the coupled circuits of approximately 3.1–4.1 megacycles, that is, a pass band equivalent to the double side-band portion of the subcarrier wave signal. The coupled tuned circuits 51 and 53 have an over-all phase delay inherent in such circuits and the delay of the delay line 52 is made equal to that of circuits 51 and 53. In order to provide a load circuit for the 4.1–5.1 megacycle components to be developed, the delay line 52 is designed to have a pass band of 2.1–5.1 megacycles, though signals having only the frequency range of 2.1–4.1 megacycles are translated therethrough from the output circuit of the amplifier 26. The impedances of the circuits 51 and 53 and the terminating impedances of the delay line 52 may be made equal for convenience. The pass band of the delay line 52 is represented by Curve A of Fig. 5 while that of the coupled tuned circuits 51, 53 is represented by Curve B of Fig. 5. The phase-translation characteristic of the coupled circuits 51 and 53 is the inverse of that for the delay line 52. Consequently, signals developed in the output circuit of the delay line 52 which correspond to the signals developed in the tuned circuit 53 are equal and opposite in magnitude. Such correspondence occurs over the band of frequency 3.1–4.1 megacycles. Therefore, the over-all pass band of the system including the units 51, 52, and 53 is such as represented by Curve C of Fig. 5.

The signal-modifying circuit of Fig. 4 includes a diode 54 having the anode thereof coupled to the tuned circuit 53 and the cathode coupled in series through a tuned circuit 56 and a biasing circuit 57 to ground. The circuit 56 is resonant at the second harmonic frequency of the subcarrier wave signal, that is, at approximately 7.2 megacycles. An output circuit of the reference-signal generator is coupled through a phase-modifying circuit 58 and a second harmonic amplifier 59 to a resonant circuit 55 tuned to approximately 7.2 megacycles and which is inductively coupled to the resonant circuit 56. The phase-modifying circuit 58 is arranged to delay the phase of the signal developed in the generator 18 so that the 7.2 megacycle signal in the cathode circuit of the diode 54 is in phase with that phase of the subcarrier wave signal at which the Q-modulation component occurs. The biasing circuit 57 develops a positive potential during conduction periods of the diode 54 which tends to maintain the diode nonconductive. The potential of the 7.2 megacycle signal is such as to render the diode 54 conductive at the times of the negative peaks thereof damping any signal then being applied to the anode of the diode 54.

Considering now the operation of the apparatus of Fig. 4, the subcarrier wave signal modulated over the range of 2.1–4.1 megacycles is applied through the condenser 50 to the resonant circuit 51 and through the circuit 51 to the input circuit of the delay line 52. Such applied subcarrier wave signal is translated through the delay line 52 with some delay to develop across the output circuit thereof a subcarrier wave signal corresponding to the applied subcarrier wave signal delayed by a specific amount. The subcarrier wave signal applied to the resonant circuit 51 is applied to the resonant circuit 53 to induce in the latter resonant circuit a subcarrier modulated wave signal effectively having frequencies over the range of 3.1–4.1 megacycles and inverted in-phase with respect to the signal developed in the output circuit of the delay line 52. Consequently, the subcarrier wave signal developed between the anode of the tube 54 and ground effectively has no frequency components in the range of 3.1–4.1 megacycles, having only components in the range of 2.1–3.1 megacycles such as represented by Curve C of Fig. 5. At the top on the inductor of the resonant circuit 53, since this tap with respect to either end terminal of the resonant circuit 53 has less impedance than the circuit 53 and therefore less than the output impedance of the delay line 52, the inverse signal is not of sufficient magnitude to effect complete cancellation of the signal developed at the output circuit of the delay line 52. Consequently, at such tap a signal is developed such as represented by Curve C of Fig. 5 but having components in the frequency range of 3.1–4.1 megacycles such as represented by Curve C′ of Fig. 5.

Figure 5:
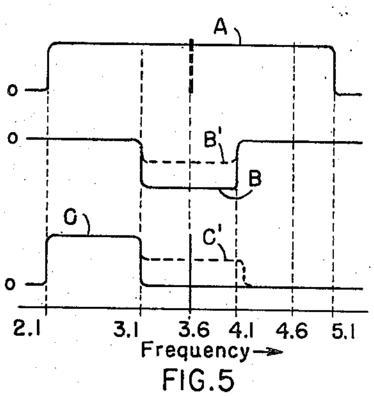
Fig. 5 is a spectrum diagram useful in explaining the operation of the modifying apparatus of Fig. 4, and Figs. 6*a*–6*d*, inclusive, and 7*a*–7*d*, inclusive, are spectrum and vector diagrams also useful in explaining the operation of the modifying apparatus of Fig. 4.

The manner in which a subcarrier wave signal, having a frequency-amplitude characteristic such as represented by Curve C of Fig. 5, is developed in the resonant circuit 53 has just been described. To understand how a periodically conductive diode, such as diode 54 conductive in-phase with the Q axis of the subcarrier wave signal, operates to develop a resultant subcarrier wave signal double side-band modulated by both the I- and Q-modulator components, it is initially helpful to consider some of the characteristics of a single side-band component such as the I component in the range of 2.1–3.1 megacycles. A reasonably thorough consideration of single side-band transmission has been presented in an article entitled "Effect of the Quadrature Component in Single Side Band Transmission" at pages 63–73, inclusive, of The Bell System Technical Journal for 1940. This article supports the proposition that the power or energy of a single side-band component is distributed substantially equally in quadrature components, that is, in amplitude-modulation and phase-modulation of the carrier wave signal resulting in the amplitude-phase ambiguity attributed to single side-band transmission. Effectively a single side-band component can be considered to have two sets of side bands, one being in-phase and the other in quadrature-phase with the carrier wave signal. This relationship is represented by the spectrum diagrams of Figs. 6*a*–6*d*, inclusive, and the related vector diagrams of Figs. 7*a*–7*d*, inclusive, representing the I single side-band component in the frequency region of 2.1–3.1 megacycles. The reference axis in the vector diagrams of Figs. 7*a*–7*d*, inclusive, is that phase of the subcarrier wave signal at which the I signal should effect amplitude-modulation.

Figure 6A:
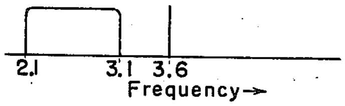
Figure 6B:
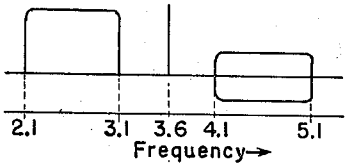
Figure 7A:
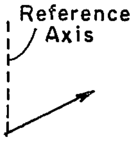
Figure 7B:
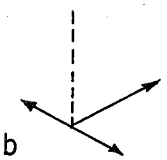

In Fig. 6*a*, the relationship in frequency and amplitude of the single side-band component to the subcarrier wave signal is represented and Fig. 7*a* is a vector representation of the magnitude and phase of such single side-band I component. Without disturbing the validity of representation, the single side-band component represented by Figs. 6*a* and 7*a* may be represented as including an upper side-band component of equal energy, half of which is in a positive sense and the other half in a negative sense so that the two halves cancel each other leaving only the single side-band component. Figs. 6*b* and 7*b* represent the single side-band component with the addition of such upper side-band component. It is obvious that in Figs. 6*b* and 7*b* the halves of the added upper side-band component cancel each other and, therefore, the representations of Figs. 6*b* and 7*b* are as valid as the representations of Figs. 6*a* and 7*a*. However, the representations of Figs. 6*b* and 7*b* assist materially in indicating some fundamental aspects of a single side-band component as verified from experiments described in the article referred to above.

Figure 6C:
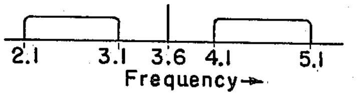
Figure 6D:
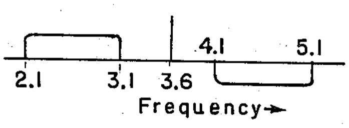
Figure 7C:
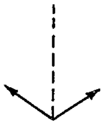
Figure 7D:
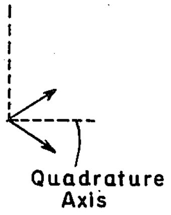

The side-band components represented by Figs. 6*b* and 7*b* are separable into two sets of equal side-band components. One of such sets is represented by Figs. 6*c* and 7*c* and includes the side-band components symmetrically disposed about the reference axis and thus these figures represent side-band components which effect pure amplitude-modulation of the I-modulation phase of the subcarrier wave signal. The other set of side-band components is represented by Figs. 6*d* and 7*d* and is symmetrically disposed about an axis in-quadrature with the reference axis or, more specifically, that axis of the subcarrier wave signal at which the Q signal effects amplitude-modulation of such subcarrier wave signal. Consequently, the side-band components represented by Figs. 6*d* and 7*d* represent amplitude-modulation of the subcarrier wave signal at the Q axis and thus represent cross talk of the I-modulation signal into the Q-modulation signal. This is the undesirable cross talk eliminated by means of wave-signal modifying apparatus in accordance with the present invention.

The signal developed across the diode circuit including the networks 56, 57 and the diode 54 has the spectrum represented by Curve C of Fig. 5 unmodified by the portion represented by Curve C'. The diode 54 is normally nonconductive due to the bias developed in the network 57. The 7.2 megacycle signal applied by means of the resonant circuit 56 to the cathode of the diode 54 is, as has been explained previously, phased so that the negative peaks thereof are in phase with the Q-modulation axis of the modulated subcarrier wave signal applied to the anode of the diode. Since, as represented by Curve C of Fig. 5, the subcarrier wave signal applied to the diode 54 includes no Q-modulation components, that is, includes no energy in the region of 3.1–4.1 megacycles, the diode 54 cannot respond to components in this region and, therefore, has no effect on the double side-band Q components of the subcarrier wave signal. However, the applied subcarrier wave signal does include components in the region of 2.1–3.1 megacycles, these components representing the single side-band modulation effected by the I signal. The diode 54 is, as has been described, rendered conductive in phase with the Q-modulation phase and thus is rendered conductive in phase with the components represented by Figs. 6*d* and 7*d*. Consequently, such components are effectively shunted to ground by the conducting diode leaving only those I components which effect amplitude-modulation of the subcarrier wave signal at the proper phase and which are represented by Figs. 6*c* and 7*c*. Thus, effectively the subcarrier wave signal is modified to have upper and lower side-band modulation components, such as represented by Figs. 6*c* and 7*c*, in place of what previously was only single side-band modulation of the subcarrier wave signal. Consequently, the signal developed at the tap terminal of the resonant circuit 53 and including I and Q double side-band components for the region of 3.1–4.1 megacycles, as represented by Curve C' of Fig. 5, and I double side-band components in the regions 2.1–3.1 and 4.1–5.1 megacycles, as represented by Figs. 6*c* and 7*c*, is a subcarrier wave signal fully double side-band modulated by both the Q and I components. This signal is utilized in the detection apparatus, such as the unit 16 of Fig. 1, in the manner previously considered herein. The signal developed at the tap terminal of the resonant circuit 53 is employed to provide a wave signal modulated to equal levels of the I and Q components. This is accomplished because the level of the signal at the tap terminal is a fraction of that at the delay-line termination for the double side-band components in the frequency range of 3.1–4.1 megacycles, for example, a level of one-half that at the delay line. As indicated by the levels of the side-band components represented by Fig. 6*c*, the I-modulated portion of the subcarrier wave signal, that is, the components in the frequency ranges of 2.1–3.1 and 4.1–5.1 megacycles, are attenuated by the signal-modifying process to be approximately one-half the level of the I-modulated side-band portion represented by Fig. 6*a*. In order to retain equality of modulation level, it is desired that the double side-band modulated portion of the wave signal be similarly attenuated, that is, the portion in the range of 3.1–4.1 megacycles, and this is effected by employing the signal at the tap terminal of the tuned circuit 53. If the output signal is taken from the delay line only, then the components in the range of 3.1–4.1 megacycles are twice the intensity of those in the ranges 2.1–3.1 and 4.1–5.1 megacycles. This might be desirable to provide increased gain for the low-frequency derived components, that is, to provide low-frequency boost if such is found to be beneficial.

The development of the upper side band of the I component may also be considered as a heterodyning operation in which the I-signal side-band components in the range of 2.1–3.1 megacycles are heterodyned with the 7.2 megacycle signal in the cathode circuit of the diode 54 to develop the 4.1–5.1 megacycle components. When so considered, the operation of the diode 54, conductive in-phase with the Q components, is such as to damp out the Q components at a 7.2 megacycle rate. The shunted Q components heterodyne with the 7.2 megacycle switching of the diode to develop an upper side-band component.

Though there have been described herein circuits for converting a subcarrier wave signal at least partially single side-band modulated to another subcarrier wave signal entirely double side-band modulated and from which *R—Y* and *B—Y* modulation components may be directly derived with all the benefits of initially deriving I and Q components, it should be understood that the invention is broadly directed to the conversion of one type of wave signal to another and not to the conversion of a specific wave signal to a specific other wave signal for the purpose solely of deriving the specific modulation components described herein. The resultant wave signal double side-band modulated may be utilized in any manner desirable and any modulation components may be derived therefrom, such as the color-difference signals described herein or others, and such components will effectively have the benefits of double side-band modulation and be free from the deficiencies and limitations of single side-band modulation. Additionally, though the description herein has been directed to utilization of the invention with three-gun picture tubes, modifying apparatus in accordance with the present invention also has extensive utility in single-gun picture tubes where the color detection occurs within the picture tube. It will be evident that such single-gun tubes have specific detection characteristics determined by the design of the tube and thus require the composite signal applied to such picture tubes to be of such form as to cooperate with the detection process. Modifying apparatus in accordance with the present invention is useful in altering the composite signal to make it suitable for such purpose.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A wave-signal modifying apparatus comprising: a circuit for supplying a wave signal double side-band modulated at one phase by one component and at least partially single side-band modulated at another phase by another component; a transformer having a primary circuit and a tapped secondary circuit broadly resonant at the mean frequency of said wave signal, said primary circuit being coupled to said supply circuit for translating said wave signal through said transformer to said secondary circuit with a band width including the double side-band portion of said one component; a time-delay network having an input circuit coupled in series with said primary circuit and an output circuit coupled in series with said secondary circuit for translating said wave signal with a band width including both the single and double side-band portions thereof and antiphase to the signal translated through said transformer for developing said single side-band portion across said series-connected secondary circuit and output circuit; signal-modifying circuit means coupled to said series-connected secondary circuit and output circuit and including a periodically conductive diode responsive to said developed single side-band portion of said wave signal; and means for controlling the conductivity of said diode in synchronism with one of said modulation phases for causing said signal-modifying circuit means to develop at the tap of said secondary circuit of said transformer the complementary side band of said single side-band portion of said wave signal and to modify said wave signal into a resultant wave signal double side-band modulated by said one and other components.

2. A wave-signal modifying apparatus for an NTSC type of color-television receiver comprising: a circuit for supplying an NTSC type of subcarrier wave signal having a mean frequency of approximately 3.6 megacycles and double side-band modulated at one phase by a signal Q representative of one color range of an image and at least partially single side-band modulated at another phase by a signal I representative of another color range of an image; a transformer having a primary circuit and a tapped secondary circuit broadly resonant at 3.6 megacycles, said primary circuit being coupled to said supply circuit for translating said wave signal through said transformer to said secondary circuit with a band width including the double side-band portion of said Q signal; a time-delay network having an input circuit coupled in series with said primary circuit and an output circuit coupled in series with said secondary circuit for translating said wave signal with a band width including both the single and double side-band portions thereof and antiphase to the signal translated through said transformer for developing said single side-band portion of said I signal across said series-connected secondary circuit and output circuit; signal-modifying circuit means coupled to said series-connected secondary circuit and output circuit and including a periodically conductive diode responsive to said developed single side-band portion of said wave signal; and means for controlling the conductivity of said diode in synchronism with the modulation phase of said Q signal for causing said diode to shunt all components of said developed single side-band portion in phase with said Q-modulation phase and to develop at the tap of said secondary circuit of said transformer the complementary side band of said single side band and to modify said wave signal into a resultant wave signal double side-band modulated by said I and Q signals.

3. A wave-signal modifying apparatus comprising: a circuit for supplying a wave signal which is double side-band modulated at one phase by one modulating component and at least partially single side-band modulated at another phase by another modulating component, the single side-band modulation of said signal extending over a frequency band beyond that of the double side-band modulation; signal-translating means coupled to said supply circuit and having a band width at least including the double side-band modulation of said signal; frequency-selective means coupled to said supply circuit and adapted to cooperate with said translating means to provide a band width substantially coextensive with the frequency band of the single side-band modulation of said signal; signal-modifying means connected to said frequency-selective means for receiving said single side-band modulation therefrom and adapted to derive the complementary side-band modulation required to convert it to double side-band modulation; and signal-combining means connected to said translating means and said modifying means for combining the modulations produced thereby into a resultant wave signal which is double side-band modulated at said one and other phases, respectively, by said one and other modulating components.

4. A wave-signal modifying apparatus comprising: a chrominance-signal amplifier for supplying a subcarrier wave signal which is double side-band modulated at one phase by one modulating component representative of a color of a derived image and at least partially single side-band modulated at another phase by another modulating component representative of another color of the televised image, the single side-band modulation of said signal extending over a frequency band beyond that of the double side-band modulation; signal-translating means coupled to said amplifier and having a band width at least including the double side-band modulation of said signal; frequency-selective means coupled to said amplifier and adapted to cooperate with said translating means to provide a band width substantially coextensive with the frequency band of the single side-band modulation of said signal; signal-modifying means coupled to said frequency-selective means for receiving said single side-band modulation therefrom and adapted to derive the complementary side-band modulation required to convert it to double side-band modulation; and signal-combining means connected to said translating means and said modifying means for combining the modulations produced thereby into a resultant wave signal which is double side-band modulated at said one and other phases, respectively, by said one and other modulating components.

5. A wave-signal modifying apparatus comprising: a circuit for supplying a wave signal which is double side-band modulated at one phase by one modulating component and at least partially single side-band modulated at another phase by another modulating component, the single side-band modulation of said signal extending over a frequency band beyond that of the double side-band modulation; a first channel coupled to said supply circuit including a first band-pass filter network having a band width including at least the double side-band modulation of said signal, said first channel being adapted to translate the part of said signal lying within the band width of its filter network; a second channel further coupled to said supply circuit and comprising a second band-pass filter network which cooperates with said first filter network to provide a band width substantially coextensive with the frequency band of the single side-band modulation of said signal, said second channel further comprising a periodically conductive device; phase-responsive means additionally coupled to said supply circuit and to said device, said phase-responsive means being responsive to one of said phases of said signal for controlling the conductivity of said device in synchronism with that signal phase so as to cause said second channel to derive from the single side-band modulation of said signal the complementary side-band modulation required to convert it to double side-band modulation; and signal-combining means connected to said first and second channels for combining the modulations produced thereby into a resultant wave signal which is double side-band modulated at said one and other phases, respectively, by said one and other modulating components.

6. A wave-signal modifying apparatus for an NTSC type of color-television receiver comprising: a circuit for supplying an NTSC subcarrier wave signal which is double side-band modulated at one phase by a modulating component Q representative of one color of a televised image and at least partially single side-band modulated at another phase by a modulating component I representative of another color of the televised image, the single side-band portion of said I modulation extending over a frequency band beyond that of said Q modulation of said signal; signal-translating means coupled to said supply circuit and having a band width at least including the Q modulation of said signal; frequency-selective means further coupled to said supply circuit and adapted to cooperate with said translating means to provide a band width substantially coextensive with the frequency band of the single side-band portion of said I modulation; signal-modifying means coupled to said frequency-selective means and including a periodically conductive device; phase-responsive means additionally coupled to said supply circuit and to said device, said phase-responsive means being responsive to one of said phases of said signal for controlling the conductivity of said device in synchronism with that signal phase so as to cause said modifying means to derive from the single side-band portion of said I modulation the complementary side-band modulation required to convert it to double side-band modulation; and signal-combining means connected to said translating means and said modifying means for combining the modulation produced thereby into a resultant wave signal which is double side-band modulated at said one and other phases, respectively, by said Q and I modulating components.

7. A wave-signal modifying apparatus comprising: a circuit for supplying a wave signal which is double side-band modulated at one phase by one modulating component and at least partially single side-band modulated at another phase by another modulating component, the single side-band modulation of said signal extending over a frequency band beyond that of the double side-band modulation; a signal-translating channel coupled to said supply circuit having a band width at least including the double side-band modulation of said signal, said translating channel being adapted to translate the part of said signal lying within its band width; a signal-modifying channel further coupled to said supply circuit and adapted to cooperate with said translating channel to provide a band width substantially coextensive with the frequency band of the single side-band modulation of said signal, said modifying channel including a periodically conductive device; phase-responsive means additionally coupled to said supply circuit and to said device, said phase-responsive means being responsive to one of said signal phases for controlling the conductivity of said device in synchronism with that signal phase so as to cause said modifying channel to derive from the single side-band modulation of said signal the complementary side-band modulation required to convert it to double side-band modulation; and signal-combining means connected to said translating and modifying channels for combining the modulations produced thereby into a resultant wave signal which is double side-band modulated at said one and other phases, respectively, by said one and other modulating components.

8. A wave-signal modifying apparatus corprising: a circuit for supplying a wave signal which is double side-band modulated at one phase by one modulating component and at least partially single side-band modulated at another phase by another modulating component, the single side-band modulation of said signal extending over a frequency band beyond that of tne double side-band modulation; a signal-translating circuit coupled to said supply circuit and having a band width substantially coextensive with the double side-band modulation of said signal; a band-pass filter network further coupled to said supply circuit and having a band width substantially coextensive with the single side-band modulation of said signal; a signal-modifying circuit coupled to said filter network and including a synchronous demodulator; phase-responsive means additionally coupled to said supply circuit and to said demodulator, said phase-responsive means being responsive to said other signal phase for controlling the conductivity of said demodulator in synchronism with that signal phase so as to cause said signal-modifying circuit to derive from the single side-band modulation of said signal the complementary side-band modulation required to convert it to double side-band modulation; and signal-combining means connected to said translating circuit and to said modifying circuit for combining the modulations produced thereby into a resultant wave signal which is double side-band modulated at said one and other phases, respectively, by said one and other modulating components.

9. A wave-signal modifying apparatus comprising: a circuit for supplying a wave signal which is double side-band modulated at one phase by one modulating component and at least partially single side-band modulated at another phase by another modulating component, the single side-band modulation of said signal extending over a frequency band beyond the double side-band modulation; a signal-translating circuit coupled to said supply circuit and having a band width at least including the double side-band modulation of said signal; frequency-selective means further coupled to said supply circuit and adapted to cooperate with said translating circuit to provide a band width substantially coextensive with the single side-band modulation of said signal; a signal-modifying circuit coupled to said frequency-selective means; generating means additionally coupled to said supply circuit and responsive to one of said phases of said signal to produce a reference signal in synchronism therewith; means for connecting said generating means to said modifying circuit to render it responsive to the single side-band modulation of said signal under the control of said reference signal so as to cause said modifying circuit to develop the complementary side-band modulation required to convert said single side-band modulation to double side-band modulation; and signal-combining means coupled to said translating circuit and said modifying circuit for combining the modulations produced thereby into a resultant wave signal which is double side-band modulated at said one and other phases, respectively, by said one and other modulating components.

10. A wave signal-modifying apparatus comprising: a circuit for supplying a wave signal which is double side-band modulated at one phase by one modulating component and at least partially single side-band modulated at another phase by another modulating component, the single side-band modulation of said signal extending over a frequency band beyond the double side-band modulation; a signal-translating circuit coupled to said supply circuit and having a band width at least including the double side-band modulation of said signal; frequency-selective means further coupled to said supply circuit and adapted to cooperate with said translating circuit to provide a band width substantially coextensive with the single side-band modulation of said signal; a signal-modifying circuit coupled to said frequency-selective means; generating means additionally coupled to said supply circuit and responsive to one of said phases of said signal to produce a reference signal in synchronism therewith and at a second harmonic frequency of said signal; means for connecting said generating means to said modifying circuit to render it responsive to the single side-band modulation of said signal under the control of said reference signal so as to cause said modifying circuit to develop the complementary side-band modulation required to convert said single side-band modulation to double side-band modulation; and signal-combining means coupled to said translating circuit and said modifying circuit for combining the modulations produced thereby into a resultant wave signal which is double side-band modulated at said one and other phases, respectively, by said one and other modulating components.

11. A wave-signal modifying apparatus comprising: a circuit for supplying a wave signal which is double side-band modulated at one phase by one modulating component and at least partially single side-band modulated at another phase by another modulating component, the single side-band modulation of said signal extending over a frequency band beyond the double side-band modulation; a signal-translating circuit coupled to said supply circuit and having a band width at least including the double side-band modulation of said signal; frequency-selective means further coupled to said translating circuit and adapted to cooperate therewith to provide a band width substantially coextensive with the single side-band modulation of said signal; a signal-modifying circuit coupled to said frequency-selective means and including a periodically conductive device; generating means additionally coupled to said supply circuit and responsive to one of said phases of said signal to produce a reference signal in synchronism therewith at a harmonic frequency of said supplied signal; means for connecting said generating means to said device to control the conductivity thereof in synchronism with said reference signal so as to cause said modifying circuit to develop the complementary side-band modulation required to convert said single side-band modulation to double side-band modulation; and signal-combining means connected to said translating circuit and said modifying circuit for combining the modulations produced thereby into a resultant wave signal which is double side-band modulated at said one and other phases, respectively, by said one and other signal components.

12. A wave-signal modifying apparatus comprising: a circuit for supplying a wave signal having a mean frequency of substantially 3.6 megacycles and which is double side-band modulated at one phase substantially over the frequency range of 3.1–4.1 megacycles by one modulating component and at least partially single side-band modulated at another phase substantially over the frequency range of 2.1–3.1 megacycles by another modulating component; a first channel coupled to said supply circuit including a first band-pass filter network having a band width of at least 3.1–4.1 megacycles for translating at least the double side-band modulated portion of said signal; a second channel further coupled to said supply circuit including a second band-pass filter network having a band width substantially equal to the 2.1–3.1 megacycle single side-band modulated portion of said signal, said second channel including a periodically conductive device; phase-responsive means additionally coupled to said supply circuit and to said device, said phase-responsive means being responsive to one of said signal phases for controlling the conductivity of said device in synchronism with that signal phase so as to cause said second channel to derive from the single side-band modulation of said signal the 4.1–5.1 megacycle complementary side-band modulation required to convert it to double side-band modulation; and signal-combining means connected to said first and second channels for combining the modulations produced thereby into a resultant wave signal which is double side-band modulated at said one and other phases, respectively, by said one and other modulating components.

References Cited in the file of this patent

UNITED STATES PATENTS 2,187,978 Lewis ---------------- Jan. 23, 1940